J. C. SCOGGINS.
VEHICLE POLE OR SHAFT.
APPLICATION FILED JAN. 22, 1912.
1,030,248.   Patented June 18, 1912.
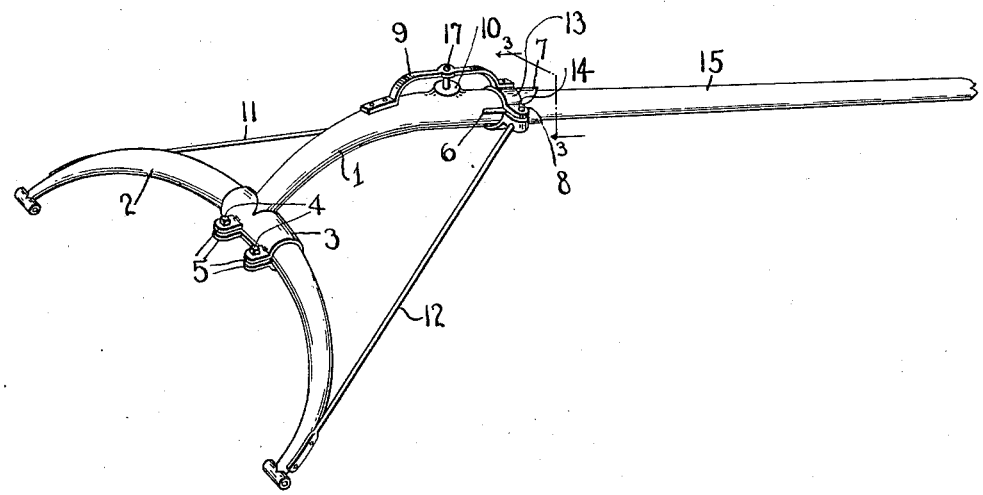
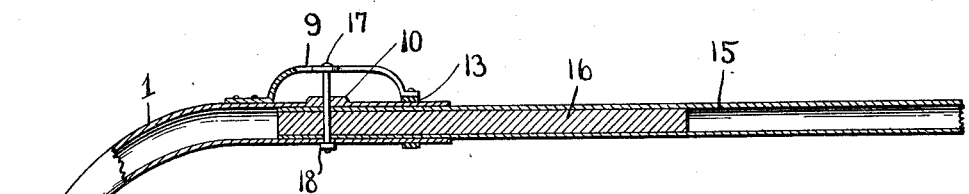
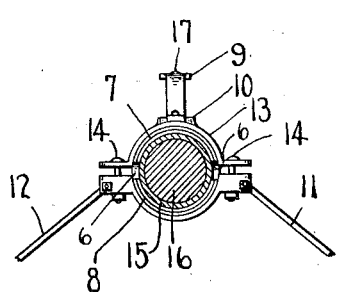
Inventor
Jesse C. Scoggins
Witnesses

UNITED STATES PATENT OFFICE.

JESSE C. SCOGGINS, OF WICHITA, KANSAS.

VEHICLE POLE OR SHAFT.

1,030,248.  Specification of Letters Patent.  Patented June 18, 1912.

Application filed January 22, 1912. Serial No. 672,668.

*To all whom it may concern:*

Be it known that I, JESSE C. SCOGGINS, a citizen of the United States, residing at Wichita, in the county of Sedgwick and State of Kansas, have invented certain new and useful Improvements in Vehicle Poles or Shafts; and I do declare the following to be a full, clear, and exact description of the invention, such as will enable others skilled in the art to which it appertains to make and use the same.

This invention relates to improvements in vehicle pole and shaft construction.

The object of the invention is to provide draft devices of this character formed from reinforced tubular metal sections detachably secured together to provide for their ready separation for repairing and other purposes.

With this and other objects in view, the invention consists of certain novel features of construction, combination and arrangement of parts as will be more fully described and particularly pointed out in the appended claim.

In the accompanying drawings: Figure 1 represents a perspective view of a vehicle draft pole constructed in accordance with this invention. Fig. 2 is a vertical, longitudinal section thereof, and Fig. 3 is a transverse section taken on the line 3—3 of Fig. 1.

In the form shown in Figs. 1, 2 and 3 a cast iron or steel socket or boot 1 is shown extending centrally from a tongue or pole iron 2 which is made in the ordinary semicircular shape and composed of tubular metal, preferably of steel. This socket is preferably secured to the pole iron 2 by means of a clamp 3 made integral with the rear end of said socket and secured in operative position by means of clamping bolts as 4 which pass through oppositely disposed lugs or ears as 5 projecting laterally from the member 3. The front end of the sacket 1 is preferably slit longitudinally on opposite sides as shown at 6 to provide clamping jaws 7 and 8 to receive the pole 15 hereinafter described.

An arched bar or plate 9 is secured to the socket 1 near its front end on its upper face between which and said socket a double tree, not shown, is adapted to be secured; the socket being preferably provided with a plate 10 arranged below the aperture in the bar 9 through which the securing bolt for the double tree is adapted to pass.

A split clamping band 13 extends around the slit end of the socket member and has laterally extending apertured ears through which clamping draw bolts 14 extend and which are designed to draw said jaws 7 and 8 together to securely clamp the pole 15 between them. These draw bolts 14 secure one end of the braces 11 and 12 to the socket member 1, the other ends of said braces being secured to the pole iron 2 near the extremities thereof.

The pole 15 is made, as shown, of tubular metal, preferably of steel and a reinforcing filling member 16 is arranged within the rear end of the pole and is preferably made of wood, and is designed to prevent the steel tube from bending where the greatest amount of strain is exerted thereon. This filling member 16 extends to about one-third of the length of the pole, more or less, projecting some distance beyond the point of connection of the pole with the boot or socket 1. In the assembling of parts, the reinforced end of this tubular pole is inserted within the slit end of the socket 1 and the clamping band 13 is locked in position by tightening up the draw bolts 14.

A bolt 17 which secures the double tree in position extends also transversely through the boot and through the reinforced end of the pole which is inserted within the boot and is held securely in position by means of the usual clamping nut 18.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

What is claimed as new is:

A vehicle draft device comprising a draft iron, a tubular boot connected thereto and having its front end slit longitudinally to form clamping jaws, a longitudinally extending tubular member having one end inserted within the slit end of said boot, a reinforcing filling element arranged in the rear portion of said tubular member and extending beyond the end of said boot when the parts are assembled, a split clamping band encircling said slit boot end and having laterally extending apertured ears, draw bolts passing through said apertured ears to pull said jaws together and clamp said tubular member between the parts of the boot, a double tree securing bolt passing through the boot and tubular member, and braces extending from said draft iron to the draw bolts.

In testimony whereof I have hereunto set my hand in presence of two subscribing witnesses.

JESSE C. SCOGGINS.

Witnesses:
 THOMAS EMMET CROZIER,
 W. L. PIERPOINT.

Copies of this patent may be obtained for five cents each, by addressing the "Commissioner of Patents, Washington, D. C."